United States Patent [19]
Carver

[11] 3,889,047
[45] June 10, 1975

[54] SEALING AND MOISTURE-PROOFING OF ELECTRICAL JOINTS

[75] Inventor: David Carver, Sherman Oaks, Calif.

[73] Assignee: Lockheed Aircraft Corporation, Burbank, Calif.

[22] Filed: Feb. 15, 1974

[21] Appl. No.: 443,105

[52] U.S. Cl............ 174/84 R; 29/628; 174/76; 156/49; 156/51; 262/272
[51] Int. Cl............................................ H02g 15/08
[58] Field of Search........... 174/DIG. 8, 84 R, 88 R, 174/91–93, 76, 77 R; 29/628; 156/49; 260/23.5 R, 885; 264/272

[56] References Cited
UNITED STATES PATENTS

| | | | |
|---|---|---|---|
| 3,300,547 | 1/1967 | Gorman et al...................... | 260/885 |
| 3,387,364 | 6/1968 | Boggs...................... | 174/DIG. 8 UX |
| 3,547,851 | 12/1970 | Fraunglass...................... | 26/23.5 R |
| 3,691,505 | 9/1972 | Graves.............................. | 174/84 R |

*Primary Examiner*—Darrell L. Clay
*Attorney, Agent, or Firm*—Billy G. Corber; Ralph M. Flygare

[57] ABSTRACT

Water-proof insulation for an electrical connection comprising a protective solid anaerobic coating on the electrical conductors enclosed within a heat shrinkable plastic sleeve. A coating of anaerobic sealant is applied to the surfaces of the conductors comprising the electrical connection and a sleeve of heat shrinkable plastic is placed around the sealant-coated conductors. The assembly is then heated, thereby shrinking the plastic sleeve so as to prevent air from reaching the sealant, which then polymerizes. The resulting flexible insulated joint is water-proof and resists corrosion. The joint may be readily repaired by splitting and removing the plastic sleeve, and removing the polymerized sealant with an appropriate solvent.

3 Claims, 5 Drawing Figures

SEALING AND MOISTURE-PROOFING OF ELECTRICAL JOINTS

BACKGROUND OF THE INVENTION

The invention pertains to electrical cable insulation and more particularly to means for insulating an electrical connection made between two or more insulated conductors.

Heretofore many means have been employed for fabricating moisture-proof electrical connections made between the stripped ends of two or more conductors. Such connections are required to protect the connection in moist or wet environments such as encountered in underground installations. Also, many electrical splices used above ground may be exposed to corrosive environments. Exposure to rain and snow also necessitates moisture-resistent connections. Commonly, electrical wire joints are wrapped with insulating tape. To provide more reliable insulation, heat shrinkable sleeves are frequently used. Sleeves of a length sufficient to extend beyond the stripped ends of the conductors will cover and protect the wire from external contact. In certain instances, cured-in-place dielectric materials such as rubber or epoxy resins have been used, either alone, or in cooperation with, heat-shrinkable sleeves to further improve the integrity of the insulated connection. Typical of the prior art means for effecting such splices is shown in U.S. Pat. No. 3,691,505 in which a layer of semicured vulcanizable insulation is applied about the conductors and onto the exposed surfaces of the wires. A heat-shrinkable tube is placed about the joint and heated to compress and vulcanize the vulcanizable material and complete the splice.

Although the last-described technique of the prior art has been found to be satisfactory for many applications, it has a number of practical limitations. Specifically, the vulcanizable materials require close control over the cure-time and the cure temperature. Also, the finished product has significant limitations as to mechanical strength and compatibility with environmental conditions.

Another significant problem in splicing electrical cables is the impairment of strength of the outer portions of the cable itself. That is, the stripping of the exterior insulating sheath in order to expose the electrical conductors for making the connection, tends to materially reduce the overall strength of the cable joint. The problem is, therefore, not only to provide a waterproof seal extending from the insulating sheath of the end of one cable to the insulating sheath of the end of the other cable, but is also to provide sufficient strength between these two cable ends so that breakage under stress does not occur in the area of the splice. Desirably, the load strength of a splice should exceed the minimum breaking load of an unspliced cable.

BRIEF SUMMARY OF THE INVENTION

The present invention comprises a water-proof sealed electrical joint in which the electrical conductors are coated with an anaerobic sealant which in turn is confined within a heat-shrinkable plastic sleeve to exclude air and thereby polymerize the anaerobic sealant. The invention also contemplates the novel method of fabricating such joints.

The present invention is an improvement over prior art techniques by reason of its use of anaerobic materials. When deprived of air in a joint, anaerobic sealants, which are one-part polyester resins, will harden into a strong thermoset coating. Hardening is not only accomplished by absence of air but also by the catalytic influence of the metallic conductors. Cured anaerobics typically are stable up to 300°F and have strengths up to 40,000 psi. Anaerobic materials as employed in the invention are superior to prior insulators insofar as they generally resist water, natural or synthetic lubricants, fuels, organic solvents, and refrigerants. They also have good compressive strength and when cured into thermoset films they develop compressive moduli reaching from 20,000 to 40,000 psi.

It is, therefore, an object of the present invention to provide a novel and improved insulated joint for electrical wires.

Another object of the invention is to provide a novel and improved water-proof sealed electrical joint utilizing an anaerobic sealant in conjunction with a heat-shrinkable sheath.

Yet another object of the invention is to provide a novel and improved process for making mechanically-strong, water-proof, electrical joints.

A still further object of the present invention is to provide a novel and improved means for protecting electrical wire splices from hazardous environments.

Yet still another object of the invention is to provide a novel and improved electrical joint of high environmental integrity yet which may be easily repaired.

DESCRIPTION OF THE PREFERRED EMBODIMENT

Figure 1:
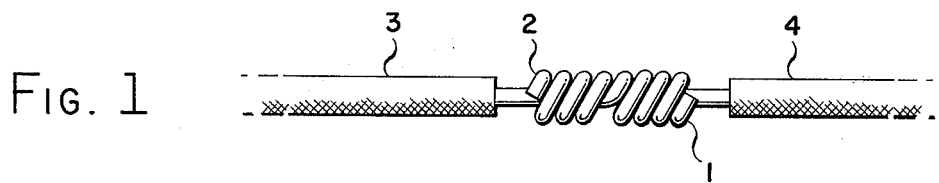
FIG. 1 is a fragmentary elevation view showing a first stage of the fabrication of an electrical joint constructed in accordance with the invention.

With reference to FIG. 1 there are shown two insulated wires, the conductive ends 1 and 2 of which have been twisted together to form a mechanical splice. The outer insulating jackets 3 and 4 of the two wires have been stripped from the ends by an amount sufficient to permit making the splice of the conductor ends 1 and 2.

Figure 2:
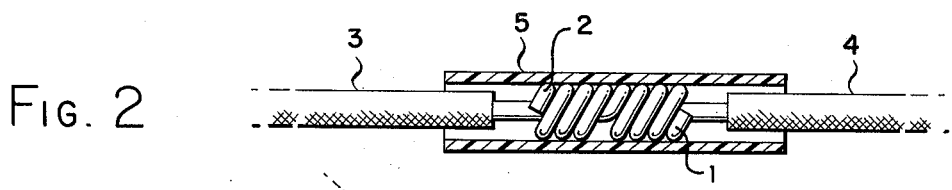
FIGS. 2, 3 and 4 are views similar to FIG. 1 but showing successive stages of manufacture.

It should be understood that the invention is equally applicable to uninsulated wires. The next stage in the preparation of the splice is shown in FIG. 2 wherein a heat-shrinkable plastic tube or sleeve 5 is positioned so as to encircle the spliced conductors (1 and 2). Such sleeve is formed of a flexible dielectric neoprene or cross-linked polyolefin material which has been so modified in chemical structure that it will shrink in diameter by as much as 50% upon subjection to an elevated temperature (typically in excess of approximately 175°C). Such heat shrinkable materials are well-known in the art. Examples of materials useful in forming heat shrinkable sleeves of the type employed in the practice of the present invention may be found in U.S. Pat. No. 2,027,962 to Currie and U.S. Pat. No. 3,068,242 to Cook et al.

Figure 3:
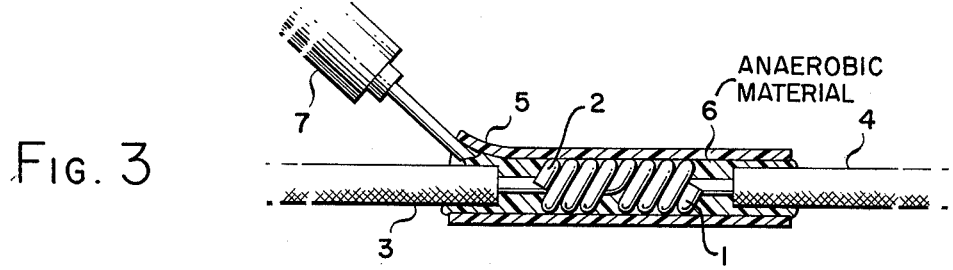
Figure 4:
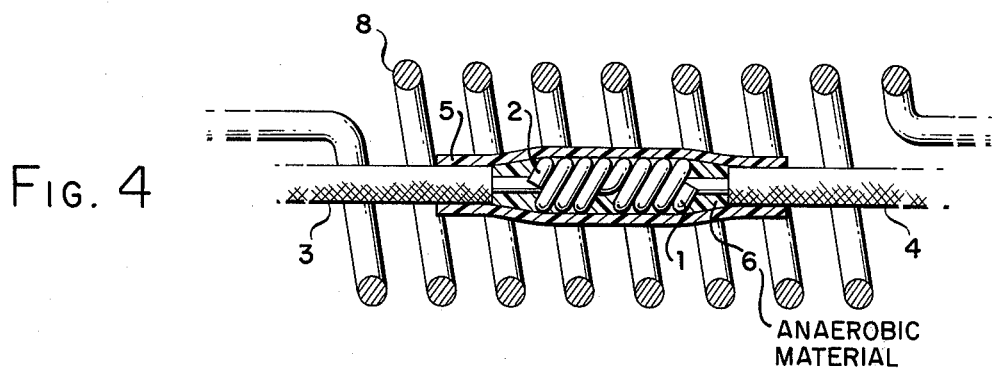

An anaerobic sealant material 6 is then introduced into the space between the inner surface of the heat shrinkable sleeve 5 and the exterior surface of the electrical conductors 1 and 2. The sealant material 6 is initially in a flowable form and may be conveniently injected into the void between the spliced wires and the sleeve 5 by means of injection tool 7. Alternatively, the sealant material 6 may be of thixotropic form and be applied to the spliced wires prior to putting sleeve 5 in place about the joint. In any event, the unpolymerized sealant material 6, and the encircling sleeve 5 are coaxially disposed with respect to the spliced ends of the wire conductors (1 and 2). Preferably the sleeve is of a length sufficient to bridge across the insulating jackets 3 and 4. The assembly as described in connection with FIG. 3 is then placed into a high-temperature environment such as may be provided by electrical resistance heating element 8 as shown in FIG. 4. The wire-splice assembly is then raised to an appropriately high temperature sufficient to cause the sleeve 5 to shrink about the sealant coated joint. The shrinking sleeve 5 will compress and confine the anaerobic sealant material 6 about the conductors (1 and 2) and will preclude ambient air from reaching the sealant (6). Upon removing the assembly from the high-temperature environment, and allowed to cool, the joint will be completed.

The response of anaerobic sealants is in part governed by the types of surfaces to which they are exposed. Clean metals such as ferrous metals, copper, aluminum, chromium and nickel alloys produce rapid and highly satisfactory cures of anaerobic compositions. The surfaces of such metals are those most commonly encountered in electrical wiring joints such as contemplated in the practice of the present invention. The invention is not, however, limited to such metals since anaerobic sealants may be cured on inactive and inhibitive surfaces by activating the surfaces by a primer or by heating. At temperatures above 100°C, the curing rates of anaerobic sealants is in the range of a few seconds to a few minutes; thus, the method described above in connection with FIGS. 1 through 4 results in a rapid curing of the anaerobic sealant. A suitable anaerobic composition is described in U.S. Pat. No. 3,300,547 to Gorman et al.

To facilitate the fabrication of a joint in accordance with the present invention it is preferred that the anaerobic sealant be thixotropic. Known flowable anaerobic sealant compositions, suitable for this purpose, are disclosed in U.S. Pat. No. 3,547,851 to Frauenglass.

Figure 5:
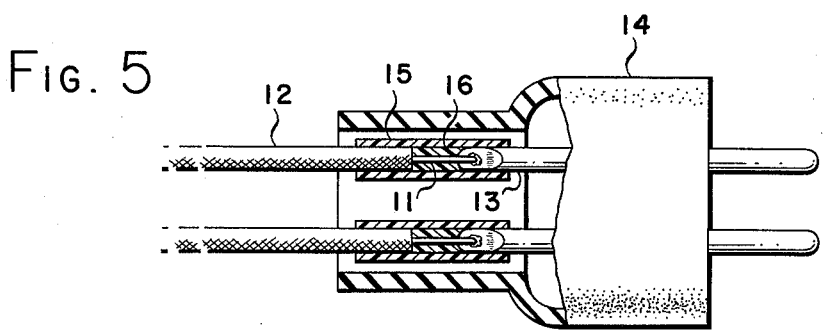
FIG. 5 is a fragmentary elevation view, partially in section, illustrating a cable connector assembly utilizing electrical joints constructed in accordance with the invention.

There is shown in FIG. 5 an electrical joint constructed in accordance with the present invention as utilized in the connection between an electrical cable and an electrical plug therefor. This arrangement comprises a pair of insulated electrical wires each having an inner conductor and an exterior dielectric jacket. Since both wire connections are alike, only one need be described in detail. Inner conductor 11 is provided with dielectric covering 12. The inner conductor 11 is mechanically attached to a metal prong 13 of plug 14. The heat shrinkable tubing 15 extends over the insulated end (12) of the cable and the abuting end of the prong 13. The anaerobic sealant 16 is compressed and confined within the heat shrinkable tubing 15 in the manner described previously so as to prevent air from reaching the sealant 16. The exclusion of air results in polymerization of the sealant 16. Thus, there is provided a strong, corrosion-resistant and water-proof electrical joint.

In the event that it is desired to repair or separate the electrical joint, the outer shrink tube or sleeve may be split with a knife or other suitable tool and peeled away from the polymerized sealant. The sealant may then be mechanically removed or chemically dissolved by an appropriate solvent. Thereafter the mechanical (metallic) joint may be unfastened by any suitable and well-known means. This arrangement permits ready repair or disassembly of the joint.

As will be appreciated by those versed in the art, various means may be employed to raise the heat shrink tube to its desirable heat recoverable temperature. Also, it will be appreciated that the elevation of the temperature for accomplishing heat recovery of the sleeve will also accelerate the polymerization of the anaerobic sealant.

Other modifications may be made in the practice of the invention without departing from the intended scope thereof. For example, the heat-shrinkable sleeve need not be a cylindrical tube, but may be of any appropriate configuration which will, upon contraction, protect the anaerobic material from coming in contact with ambient air. Also, the structure to which the anaerobic material is applied need not be an electrical wire per se, it being sufficient that the joint comprise a member which is to be protected from environmental exposure.

What is claimed is:

1. The method of making an hermetically-sealed electrical connection between two metallic conductors comprising the sequential steps of:
   mechanically joining the two ends of said electrical conductors to provide an electrical circuit path therethrough;
   disposing a heat-shrinkable dielectric sleeve about the exterior of the joined ends of said conductors;
   introducing an anaerobic sealant material between said sleeve and the joined ends of said conductors so as to cause it to be confined therebetween and to contact the metallic surfaces of said joined ends; and,
   radially shrinking said sleeve about said material, by the application of heat thereto so as to hermetically enclose said anaerobic material and cause it to polymerize by reason of the exclusion of air thereto, said polymerization being further aided by the contacting of said material with the surfaces of said metallic conductors.

2. The method as defined in claim 1 including the steps of;
   providing insulating jackets which extend away from the exposed ends of said electrical conductors; and
   disposing said sleeve so as to extend beyond the portion of said conductors in contact with said material and over at least a portion of the confronting ends of said jacket.

3. An hermetically sealed electrical joint comprising:
   first and second electrical conductors which have been joined to provide a circuit path therethrough;
   a mass of polymerized anaerobic sealant covering the joined portions of said conductors; and
   a dielectric sleeve of heat-shrunk material disposed about the outer surface of said sealant so as to maintain the polymerization thereof by the exclusion of ambient air thereto.

\* \* \* \* \*